Figures 1, 2:
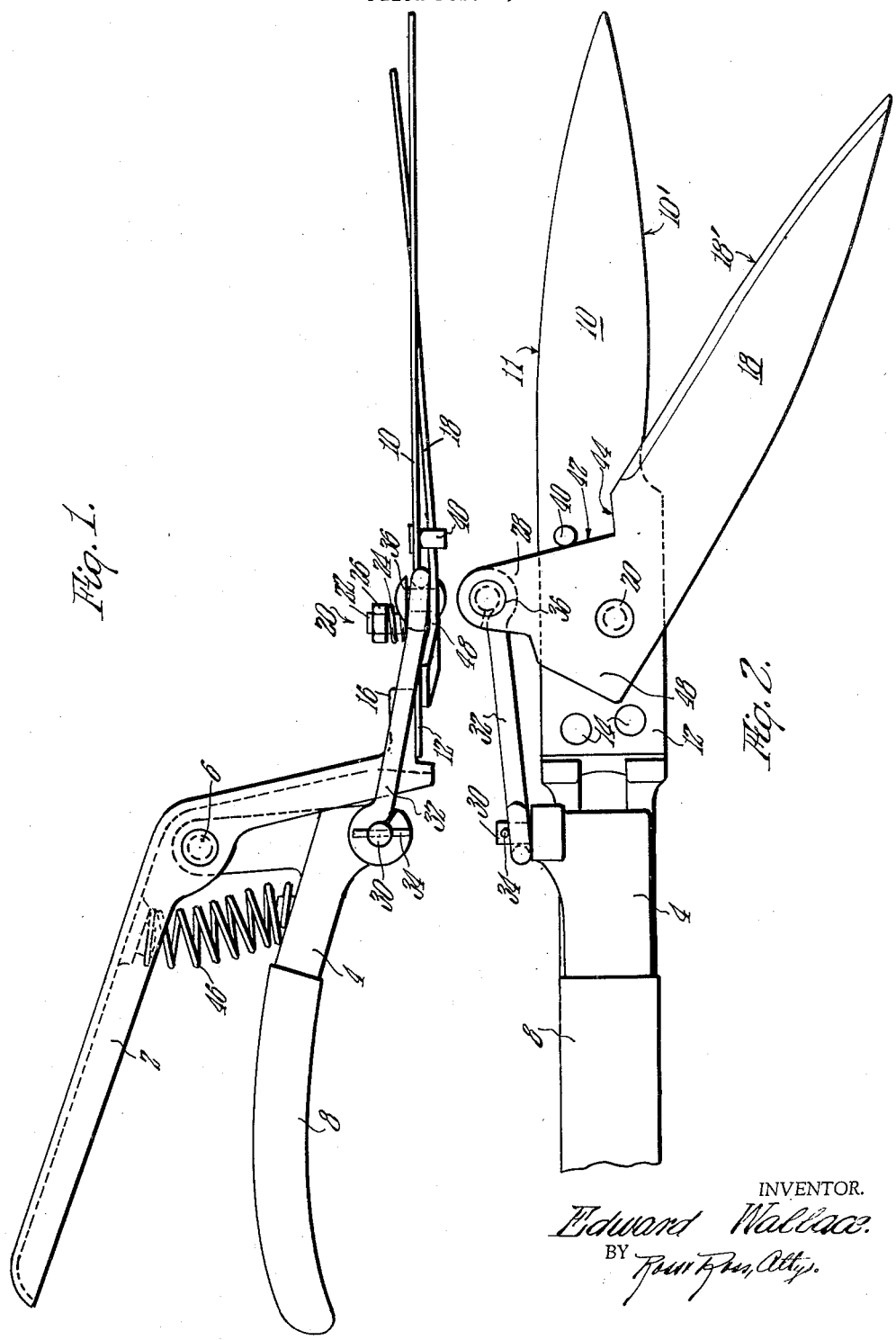

Dec. 16, 1958  E. WALLACE  2,864,164
SHEARS
Filed Feb. 6, 1958

INVENTOR.
Edward Wallace.
BY

United States Patent Office 2,864,164
Patented Dec. 16, 1958

2,864,164

SHEARS

Edward Wallace, Longmeadow, Mass.

Application February 6, 1958, Serial No. 713,648

3 Claims. (Cl. 30—248)

This invention relates to improvements in shearing and cutting device, and is directed more particularly to devices for trimming or clipping grass or the like, commonly known as grass shears.

The principal object of the invention is the provision of a shear device which is constructed and arranged in such a manner that a movable blade thereof is so operated in the cutting operation of the shear that the cutting edges of the blades cooperate with a more positive and effective shearing force than with prior art shears, whereby the shear of the invention is more efficient and is operable with less effort.

According to novel features of the invention, a movable blade is pivotally connected to a stationary blade and, as an important feature, is disposed therebelow. A pulling force is applied to the movable blade forwardly and outwardly transversely relative to the inner longitudinal cutting edge thereof, and in such a way that, in cutting operation of the shear, the cutting edge of the movable blade is pulled upwardly into positive cutting engagement with the cutting edge of the stationary blade.

In shears of the general type to which the invention relates and where the movable blade is disposed on the upper side of the stationary blade and pulled in the cutting operation of the shear, there is an inherent tendency for the blades to separate as resistance is encountered between the cutting edges of the blades, and same is of course objectionable.

The pulling force, according to this invention, is applied to the movable blade by novel means and in a manner that the action of the cutting edge of said blade is positively against and cooperates with the cutting edge of the stationary blade. Any separating tendency of the blades is entirely obviated thereby to enhance the cutting and shearing efficiency of the shear.

A shear in the form of the invention presently preferred will be hereinafter described, and various novel features thereof will be observed and referred to in connection with the accompanying drawings wherein:

Fig. 1 is a side elevational view of a shear construction embodying the novel features of the invention; and Fig. 2 is an inverted plan view of the shear construction shown in Fig. 1.

Referring now to the drawings more in detail, the novel features of the invention will be fully described.

A frame member 2 is provided which, in the form of the invention being disclosed, may function as a handle of the shears.

An operating member 4 is pivoted at 6 to the member 2 which, for purposes of disclosure, is in the form of a handle. Said member may be provided with a sheath 8 therearound of somewhat soft or yieldable material.

A stationary blade 10, having an inner longitudinal cutting edge 10', is provided with a rear or inner end portion 12 which is suitably fixed to the member 2, as by being riveted at 14 to a portion 16 of said member. The blade and handle may be fixed together in any other well known manner or otherwise formed to provide an integral structure.

A movable blade 18 is disposed beneath the blade 10 and is pivotally connected thereto at 20 for the usual swinging movements. Said blade has a forward inner cutting edge 18' for cooperating with the cutting edge 10' of the stationary blade 10.

The pivotal connection 20 may include a stud 22 fixed to the movable blade 18 which extends through the stationary blade 10 with such clearance as may be desired for proper functioning of the shear. A compression spring 24 around the stud 22 is compressed, as may be desired, by a nut 26 on said stud to urge the blade 18 against the blade 10 with the desired pressure. Any other form of pivotal connection may be provided, if that be desired.

An arm or pivotal portion 28 adjacent the inner or rear end of the movable blade 18 extends forwardly and outwardly transversely relative to the inner cutting edge 18' thereof, and generally radially outwardly relative to the pivotal connection 20. Said portion 28 is shown as extending beyond the rear edge of the stationary blade for purposes of disclosure.

A stud 30 extends outwardly from the operating member or handle 4, and an elongated pull element 32 has its inner rear end pivoted thereon, as shown. A retainer 34, which may be in the form of a pin, extends through the stud 30, and holds the end of member 32 against displacement from off the stud 30. As shown, the pull element declines from the stud 30, and its outer forward end is pivoted to the arm portion 28 of the movable blade 18 as by a rivet 36, or by any other well known means.

A limit stop 40 is fixed to and extends downwardly from the stationary blade, as shown in Fig. 1. In the open position of the movable blade 18, an edge portion 42 of said movable blade abuts the stop 40 to limit said blade in this open position. An edge portion 44 of blade 18 abuts the stop 40 to limit said blade in its closed position.

A compression spring 46 between the members 2 and 4 urges the members apart, and thereby the movable blade 18 to its open position.

The movable blade 18 is shown as being bowed slightly longitudinally, as is usual in the shear art, and the blades are relatively arranged with the usual initial transverse cant or tilt well known in shear construction.

As important features of the shear of the invention, as viewed in Fig. 2, the pivotal connection 36 between the forward end of pull element 32 and the arm or pivotal portion 28 of the movable blade 18 is disposed outwardly and transversely forwardly relative to the prolongation of the longitudinal inner cutting edge 18' of said movable blade, while the rear inclined or offset portion 48 of said movable blade, which tranverses the stationary blade and is adapted to function as a fulcrum, is disposed inwardly and rearwardly relative to said pivotal connection 36.

As illustrated in Fig. 1, the pivotal connection 36 between the forward end of the pull element 32 and the pivotal portion 28 of the movable blade 18 is disposed upwardly relative to the engagement of the inclined fulcrum portion 48 of said blade and the underside of the stationary blade.

The components may of course be otherwise formed and arranged so that a pulling force exerted by the pulling element is exerted on the pivotal portion of arm of the movable blade in an upward direction and forwardly and outwardly transversely relative to the cutting edge of said movable blade.

As the operating member 4 of the shear is moved towards the member 2, the pull element 32 is actuated in such a manner that an upward pulling force is applied to the movable blade, thereby to pull the cutting edge of the movable blade into positive engagement with the coacting edge of the stationary blade for the desired shearing and cutting action, and without an objectionable separation of the said cutting edges.

In the cutting operation of the shear, the pull element exerts a desired upward pulling force on the movable blade so that the cutting edge thereof positively engages the cooperating edge of the stationary blade according to the force applied to the members 2 and 4 all to the end that an object between the blades cannot separate them, and thereby the most effective cutting and shearing action is attained.

What it is desired to claim and secure by Letters Patent of the United States is:

1. In a grass shear structure of the class described comprising in combination, a unitary relatively fixed handle and stationary blade with the blade extending forwardly from and below said handle, a movable blade disposed beneath the stationary blade, a pivotal connection between said blades for movement of the movable blade between open and closed positions relative to the stationary blade, said blades having longitudinal inner cutting edges and said movable blade provided with a rear end pivotal portion extending outwardly and forwardly relative to the cutting edge thereof, an operating member pivotally connected to said handle, a pull element, a rear pivotal connection between a rear end of said element and operating member, a forward pivotal connection between said rear end pivotal portion of said movable blade and forward end of said pull element, said rear and forward pivotal connections being disposed relative to the cutting edge of the movable blade whereby on movement of said operating member for moving said movable blade to its closed position the cutting edge of said blade is pulled upwardly toward and into engagement with the cutting edge of said stationary blade.

2. In a grass shear, a relatively swingable operation member, a handle having a stationary blade fixed thereto provided with a cutting edge, a movable blade having an inner cutting edge, a pivotal connection between said blades for relative swinging thereof between open and closed positions, a pull element and pivotal connections between rear and forward ends of said element and said operating member and movable blade respectively, the improvement which consists in; locating the movable blade beneath the stationary blade, locating the pivotal connection of the rear end of the pull element above the horizontal plane of the blades and the pivotal connection of the forward end of said element below said first connection and rearwardly of the outer rear edge of the stationary blade and outwardly forwardly of the cutting edge of the movable blade whereby in relative closing of the blades the element acts with an upward pulling force relative to the cutting edge of the movable blade and relative to the cutting edge of the stationary blade.

3. In a grass shear structure of the class described comprising in combination, a unitary handle and elongated stationary blade structure wherein forward and rear ends of the handle and blade respectively are rigidly connected with the blade extending forwardly of the handle and said handle is disposed upwardly relative to the horizontal plane of said blade, an elongated movable blade beneath said stationary blade, a pivotal connection between said blades for swinging of the movable blade in cutting operation relative to the stationary blade and vice versa, said blades having inner longitudinal cooperating cutting edges, an operating member pivoted relative to said handle, said movable blade having a rear pivotal portion, an elongated pull element actuated by the operating member for swinging the movable blade in cutting direction, a first pivotal connection between said operating member and a rear end of said pull element, and a second pivotal connection between a forward end of said pull element and pivotal portion of the movable blade being offset forwardly and outwardly relative to a rear prolongation of the cutting edge of the movable blade and arranged whereby as the operating member actuates the pull element to swing the movable blade in cutting operation thereof the pull element operates with an upward pulling force substantially transverse to the plane of the stationary blade so as to pull the cutting edge of the movable blade against that of said stationary blade.

References Cited in the file of this patent

UNITED STATES PATENTS

| 723,629 | Wiles | Mar. 24, 1903 |
| 936,574 | Searight | Oct. 12, 1909 |